United States Patent
Sale

(10) Patent No.: US 11,771,015 B1
(45) Date of Patent: Oct. 3, 2023

(54) NURSERY SHIPPING RACK WITH REMOVABLE SHELVING

(71) Applicant: Josh Sale, Jacksonville, FL (US)

(72) Inventor: Josh Sale, Jacksonville, FL (US)

(*) Notice: Subject to any disclaimer, the term of this patent is extended or adjusted under 35 U.S.C. 154(b) by 0 days.

(21) Appl. No.: 17/966,958

(22) Filed: Oct. 17, 2022

(51) Int. Cl.
  *A01G 9/02* (2018.01)
  *A47B 57/40* (2006.01)
  *B65D 19/44* (2006.01)

(52) U.S. Cl.
  CPC ............ *A01G 9/023* (2013.01); *A47B 57/406* (2013.01); *B65D 19/44* (2013.01); *B65D 2519/00796* (2013.01); *B65D 2519/00815* (2013.01)

(58) Field of Classification Search
  CPC ....... A47B 57/406; A47B 57/06; A47B 57/30; A47B 47/00; A47B 47/0083; A47B 47/021; A01G 9/023; B65D 19/44; B65D 2519/00796; B65D 2519/00815
  See application file for complete search history.

(56) References Cited

U.S. PATENT DOCUMENTS

| | | | |
|---|---|---|---|
| 3,102,641 A * | 9/1963 | Konstant | A47B 57/30 |
| | | | 52/646 |
| 3,603,274 A | 9/1971 | Ferdinand | |
| 4,102,275 A | 7/1978 | Spound | |
| 5,037,027 A | 8/1991 | Nichols | |
| 5,979,338 A * | 11/1999 | Salmanson | B65D 19/385 |
| | | | 108/107 |
| 6,402,167 B1 * | 6/2002 | Calleja | B65D 19/44 |
| | | | 280/47.35 |
| 6,431,090 B1 * | 8/2002 | Davis | A47B 57/04 |
| | | | 108/107 |
| 6,513,888 B1 * | 2/2003 | Lucht | A47F 5/137 |
| | | | 312/138.1 |
| 6,564,993 B1 | 5/2003 | Wassink | |
| 6,971,528 B2 * | 12/2005 | Chen | A47B 57/40 |
| | | | 211/187 |
| 7,066,342 B2 * | 6/2006 | Baechle | B65D 71/0096 |
| | | | 206/600 |
| 7,832,571 B2 * | 11/2010 | Felsenthal | A47F 5/137 |
| | | | 211/134 |
| 7,886,916 B2 | 2/2011 | Alyn | |
| 8,118,181 B2 * | 2/2012 | Shinozaki | A47B 47/0083 |
| | | | 211/208 |
| 8,561,819 B1 * | 10/2013 | Scott | A47G 25/74 |
| | | | 211/85.3 |
| 8,640,893 B2 * | 2/2014 | Kessell | A47B 57/545 |
| | | | 211/187 |
| 8,833,573 B2 * | 9/2014 | Tomaszewski | B65D 19/385 |
| | | | 206/509 |
| 9,428,298 B2 * | 8/2016 | Bersamin | B65D 5/006 |
| 9,468,292 B2 * | 10/2016 | Kuehn | A47B 57/34 |
| 10,315,798 B2 * | 6/2019 | Pfeifer | B65D 19/0012 |
| 10,750,866 B2 | 8/2020 | Grupenhof | |
| 10,772,442 B2 * | 9/2020 | Mertz, II | B65D 19/44 |

(Continued)

*Primary Examiner* — Devin K Barnett

(74) *Attorney, Agent, or Firm* — Lawrence J. Gibney, Jr.

(57) ABSTRACT

A nursery rack that is used to ship plants is often necessary for growers and retailers to easily and quickly move large amounts of plants. The device will be equipped with a plurality of removable shelves that will rest on a plurality of hooks made for that purpose. The user can decide how many shelves and the distance between the shelves depending on the particular use that is anticipated. The device provides a means to lift the device using a forklift or palletjack.

6 Claims, 4 Drawing Sheets

(56) References Cited

U.S. PATENT DOCUMENTS

| | | | |
|---|---|---|---|
| 10,835,058 B2 * | 11/2020 | Sale | A47B 57/00 |
| 10,934,053 B1 * | 3/2021 | Payson | B65D 19/0012 |
| D942,784 S | 2/2022 | Burge | |
| 11,523,687 B2 * | 12/2022 | Koetter, Jr | A47B 81/007 |
| 2002/0195410 A1 * | 12/2002 | Lin | A47B 57/16 |
| | | | 211/187 |
| 2004/0055514 A1 | 3/2004 | Deland | |
| 2005/0056604 A1 * | 3/2005 | Chen | A47B 57/40 |
| | | | 211/187 |
| 2005/0027517 A1 | 12/2005 | Huesdash | |
| 2006/0108408 A1 * | 5/2006 | Lowry | B65D 5/321 |
| | | | 229/199 |
| 2007/0017843 A1 * | 1/2007 | Keel | B65D 5/0025 |
| | | | 229/164 |
| 2007/0110511 A1 * | 5/2007 | Chen | A47B 57/40 |
| | | | 403/230 |
| 2009/0090686 A1 * | 4/2009 | Collins | A47B 57/406 |
| | | | 211/186 |
| 2013/0008865 A1 * | 1/2013 | Su | A47F 5/11 |
| | | | 248/176.1 |
| 2013/0026060 A1 | 1/2013 | Moss | |
| 2013/0276677 A1 * | 10/2013 | Kokatsu | B65D 19/06 |
| | | | 108/55.5 |
| 2016/0095429 A1 * | 4/2016 | Miranda | A47B 47/0091 |
| | | | 312/265.5 |
| 2017/0109558 A1 * | 4/2017 | Jones | G06Q 10/087 |
| 2021/0361066 A1 * | 11/2021 | Baez | A47B 47/045 |
| 2023/0078405 A1 * | 3/2023 | Taylor | B65D 19/38 |
| | | | 108/55.1 |

* cited by examiner

NURSERY SHIPPING RACK WITH REMOVABLE SHELVING

FIELD OF THE INVENTION

The device is a nursery shipping rack with removable and adjustable shelves. The shelves can be easily moved on the structure for the desired needs of the user. The device will take the shape of a cube with vertical support and reinforcing members that will provide rigidity and stability. A plurality of hooks on the device that are attached to the vertical support members provide support for the shelves. Because the spacing between the shelves can be adjusted, the user can transport different sized plants on one device and the device reduces the need to different sized nursery racks for different sized plants. Nursery shipping racks have been used for a long period of time to secure plants during shipment from the nursery to the designated delivery location. In the case of plants, plants have differing heights and it is sometimes important to be able to adjust the height or the distance between the space to accommodate different plant heights. The device is designed to be lightweight and portable but also able to withstand extreme environmental conditions.

PRIOR ART

The current applicant has obtained a patent for a nursery shipping device using a paper composite recycling material and that reference can be found at Sale, U.S. Pat. No. 10,835,058. The prior application does not teach a nursery rack with removable shelving but teaches the use of a specific type of material.

There are many references in the prior art that teach bracket systems for plants. The Ferdinand U.S. Pat. No. 3,603,274 reference is an example of this type of system. Another reference can be found at Spound U.S. Pat. No. 4,102,275 which is an example of a modular bookcase that demonstrated different configurations of storage shelves. The present application is neither a modular unit nor a bookcase.

Another reference is Nichols U.S. Pat. No. 5,037,027 teaches a tote box construction and demonstrates the many different types of construction methods to form boxes. The Wassinink U.S. Pat. No. 6,564,993 reference teaches a tote box with reinforced walls and strengtheners. Other references include Pfeifer, U.S. Pat. No. 10,315,798 which is a stackable pallet display and Moss US Patent Publication 2013/0026060 which teaches stackable boxes. The Grupenhof U.S. Pat. No. 10,750,866 reference is a built-in shelving support. This device is different than these cited references.

Another device in the prior art is Deland US Patent Publication 2004/0055514 which teaches an adjustable shelving system. While the current application does teach adjustable shelving systems, this application uses a plurality of hooks that allow the user to quickly add or remove shelves and adjust the height between the shelves.

None of the prior art references teach the features of the present invention.

BRIEF SUMMARY OF THE INVENTION

The invention is a nursery shipping rack that will allow the user to adjust the height of the shelf without modifying the outer or exterior structure of the device. Although it is contemplated that the device will be made from wood, other materials such as hard plastic or steel may also be used. Regardless of the manufacturing choice of material the material should be able to withstand extremes in environmental conditions and support substantial weight.

The nursery shipping rack which is in the general shape of a cube would have a flat planar surface with a solid base or floor surface under which forklift blades can be placed to move the entire device if needed. Attached to the sides of the floor surface, vertical members would extend upwards in a perpendicular direction relative to the floor surface. There would be a front left vertical member, a front right vertical member, a back left vertical member and a back right vertical member to form the frame of the structure of the nursery rack. On each side of the device and attached to the bottom right front and left front and top right back and top left back respectively are angular support members to provide stability for the device. A angular support member will be provided across the back of the device that will provide stability across the back of the unit. Horizontal support members would be provided across the top of the device to provide additional stability. The front surface would be open to place plants and remove shelves, if needed.

On the interior surface of the vertical members a plurality of hooks will be placed. It is anticipated that the hooks will be either placed in openings for that purpose or be manufactured as part of the device. The hooks will have a straight horizontal surface and a vertical surface that will extend upward a predetermined height. The hooks will be placed at designated intervals based on the preference of the user. The plurality of hooks will extend upwards at designated intervals.

A plurality of shelves are provided. Each of the plurality of shelves will be comprised of a flat upper surface and side surfaces that will be attached to the outer edge of the flat upper surface. The shelves will be placed over the hooks. No additional hardware is needed to install an individual shelf and plants will be placed on the top surface of each of the shelves. The weight of the plants that have been placed on the flat surface of the individual shelf will ensure that the shelf remains in place during transit.

The user can determine the spacing between the shelves by moving the individual shelf to a different set of hooks along the interior of the structure. This would permit the user to easily adjust the space between shelves to accommodate different sized plants. No hardware is needed to place the shelves on the respective hooks and provide a flat surface on which the plants will be placed.

NUMBERING REFERENCES

Figure 1:
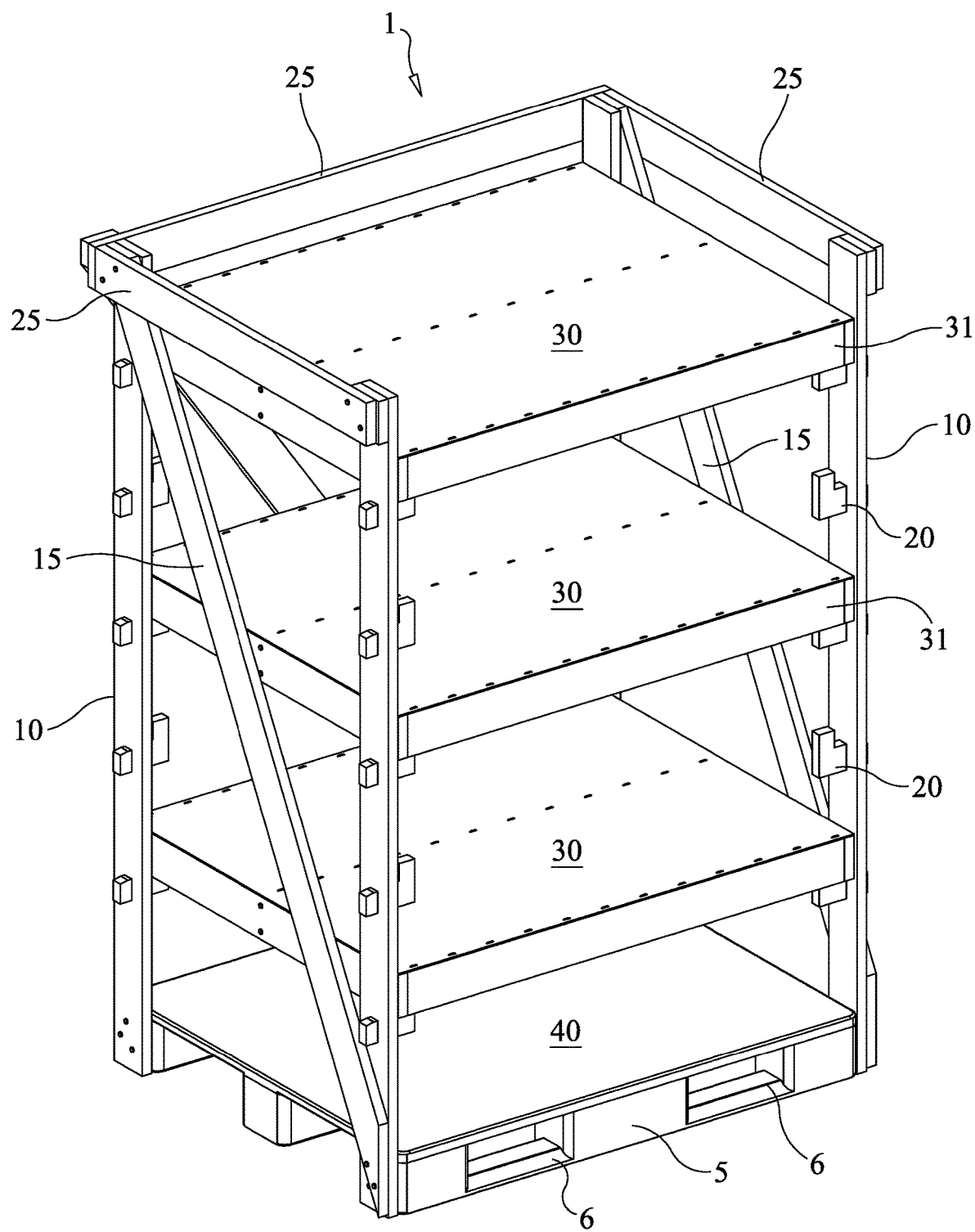
FIG. 1 is a front perspective of the nursery rack with removable shelving.

1 Device
5 Base
6 Openings for forklift blades
10 Vertical Support Members
15 Angled Side Support
16 Angled Back Support
20 Hooks 25 Horizontal Top Support Members
30 Shelf
31 Perimeter supports
35 Transverse Member
40 Base Member

DETAILED DESCRIPTION OF THE EMBODIMENTS

The nursey shipping rack 1, will be comprised of a structure that is in the general shape of a cube. It is anticipated that the device 1 will be subjected to extremes in environmental conditions but must be sturdy enough to support different types of plants. It is designed to be transported using a forklift. It is anticipated that the base member 5 may be a variety of different shapes such as either a square or rectangular. The base member 5 will have openings to insert forklift blades to transport the device.

The device will allow the user to ship different sized plants without the necessity of modifying the structure of the existing device.

The nursery shipping rack will have a base 5 that will support the weight that will be placed on the device. Openings for forklift or pallet jack blades will be provided on the base. On top of the base will be a base surface 40, which is a flat surface that will form the top of the base member 5.

A plurality of vertical support members 10 will attach to the base at the bottom and extend a predetermined distance above the base 5; the vertical support members will be identical to each other. In order to form the structure, separate vertical support members 10 will be attached to the corners of the base on the front right corner of the base, the front left corner of the base, the back right corner of the base, the back left corner of the base as depicted in FIGS. 1 and 2.

Figure 2:
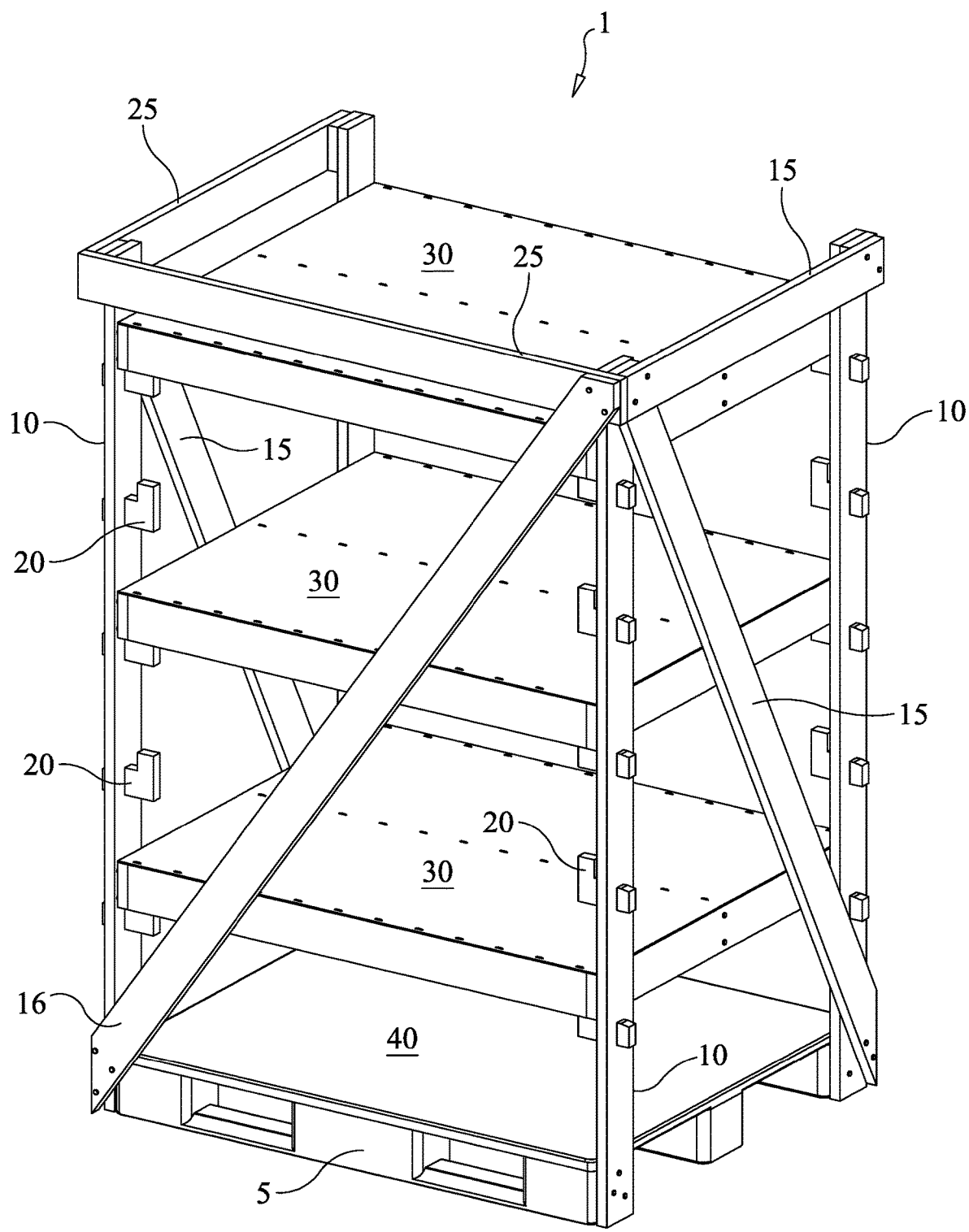
FIG. 2 is a back perspective view of the nursery rack with removable shelving.
Figure 4:
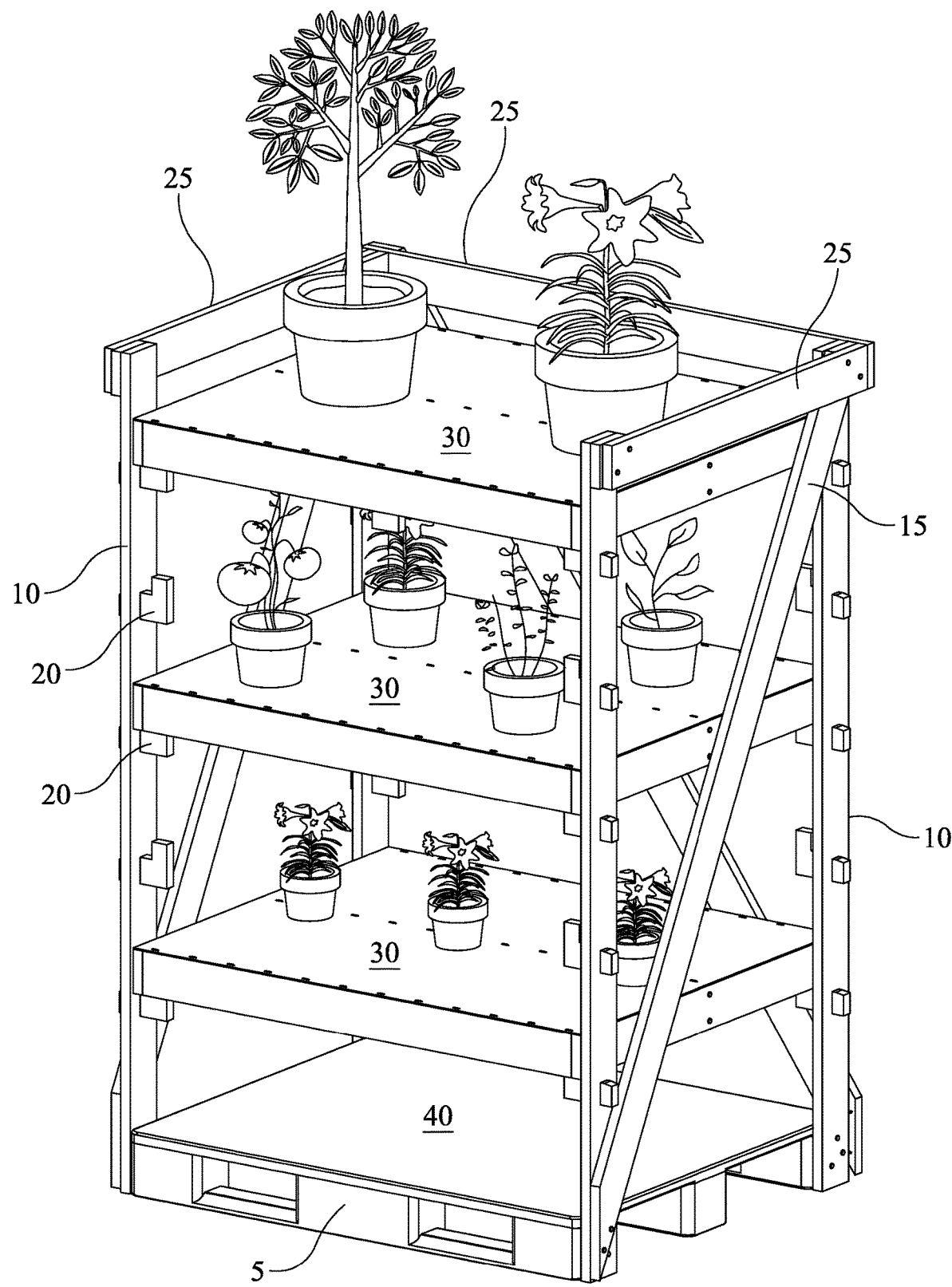
FIG. 4 is an in use view of the nursery rack with removable shelving.

In order to provide stability to the device a pair of angled support members 15 will be provided such as depicted in FIGS. 1, 2 and 4. Each of the angled support members will extend from the bottom front corner of the base to the top back corner of the vertical member. Additionally, an angled back support 16 will also be provided for added stability and rigidity. The angled back support 16 will extend from the bottom corner on one side of the base to the opposite top corner of the device 1 such as depicted in FIG. 2.

A plurality of horizontal top support members 25 are provided across the top of the unit for stability and to prevent plants from falling off the top shelf 30 during transit. It is anticipated that the horizontal support members 25 will be installed on the sides of the device and the back of the device and leave one side of the top of the device open such as depicted in FIG. 1.

A plurality of hooks 20 will be placed on the vertical support members 10. The plurality of hooks 20 may either be manufactured as part of the vertical support members 10 or openings in the vertical support members may be provided for the hooks 20. The hooks 20 should be manufactured to support the weight of the individual shelves and the weight of the plants on the shelves. The hooks 20 will have a horizontal surface and a vertical surface. The horizontal surface of the hook will extend a predetermined distance away from the vertical support members 10 and the vertical surface of the hook will extend upward a predetermined distance such as depicted in FIGS. 1 and 2. The length of the plurality of the hooks 20 will be determined by the dimension of the shelves that will be placed over the hooks.

A plurality of shelves 30 will be provided that will be placed over the hooks 20. Each of the plurality of shelves 30 will have a flat upper surface and perimeter supports 31 that will extend downward from the flat upper surface of the shelf a predetermined distance. Each of the plurality of shelves 30 can be removed by lifting the shelf off the hooks. The user can use as many shelves as desired for the desired use.

Figure 3:
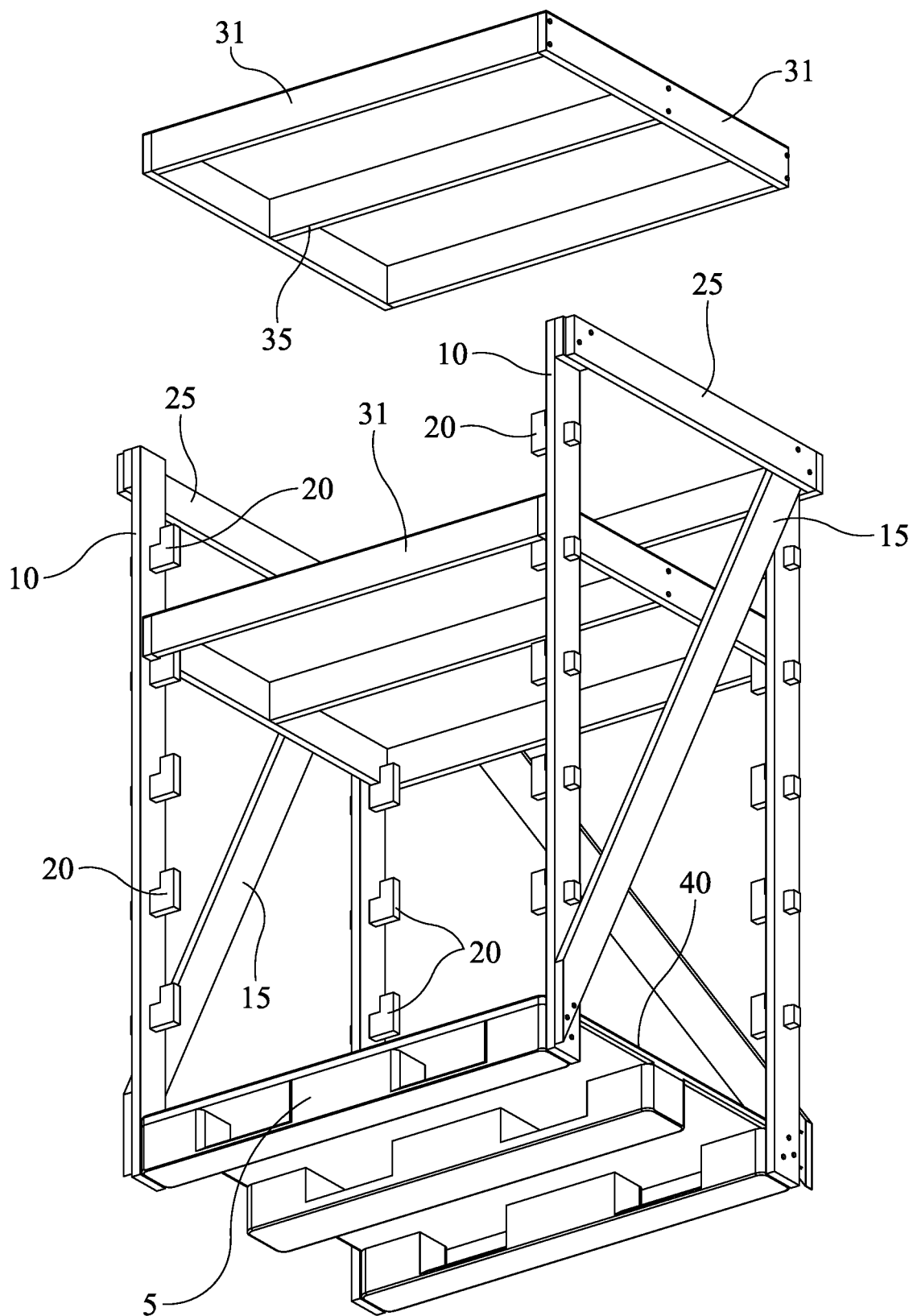
FIG. 3 is a bottom perspective view of the nursery rack with removable shelving depicting alternative shelf placement.

In order to provide additional support for the individual shelf a transverse member 35 such as depicted in FIG. 3 will be provided.

While the embodiments of the invention have been disclosed, certain modifications may be made by those skilled in the art to modify the invention without departing from the spirit of the invention.

The inventor claims:

1. A nursery shipping rack with removable shelving comprising:
a base member, wherein the base member comprises a flat top surface and a side having openings configured to receive forklift blades to lift the rack;
a plurality of vertical support members, wherein the plurality of vertical support members are attached to the corners of the base member, wherein a corresponding first vertical support member from said plurality of vertical support members is on a corresponding front right corner of the base member, wherein a corresponding second vertical support member from said plurality of vertical support members is on a corresponding front left corner of the base member, wherein a corresponding third vertical support member from said plurality of vertical support members is on a corresponding back right corner of the base member, wherein a corresponding fourth vertical support member from said plurality of vertical support members is on a corresponding back left corner of the base member;
a pair of angled support members, wherein one of the pair of angled support members is fastened to and extends from the front right corner of the base member to a top of the back right corresponding third vertical support member respectively, wherein one of the pair of angles support members is fastened to and extends from the front left corner of the base member to a top of the corresponding fourth vertical support member;
a plurality of top horizontal support members, wherein the top horizontal support members extend around three sides of a perimeter of a top portion of the rack;
a plurality of hooks, wherein the plurality of hooks are attached on the vertical support members, wherein the plurality of hooks extend a horizontal distance from the vertical support members respectively, wherein each of the plurality of hooks has a vertical surface, wherein the vertical surface extends a vertical distance;
a plurality of shelves, wherein each of the plurality of the shelves has a flat top surface, wherein each of the plurality of shelves has a transverse member, wherein each of the plurality of shelves has perimeter support members, wherein the perimeter support members attach to a bottom of the top surface of the corresponding shelves and extend downwardly therefrom, wherein the plurality of shelves are configured to be placed over corresponding hooks from the plurality of hooks to secure the shelves to the vertical support members of the rack.

2. The nursery shipping rack with removable shelving of claim 1, wherein the rack is made from wood.

3. The nursery shipping rack with removable shelving of claim 1, wherein the rack is made from plastic.

4. The nursery shipping rack with removable shelving of claim 1, wherein the rack is made from steel.

5. The nursery shipping rack with removable shelving of claim 1, wherein the plurality of hooks are removable from the vertical support members.

6. The nursery shipping rack with removable shelving of claim 1, wherein the plurality of hooks are integral with the vertical support members.

\* \* \* \* \*